US010357749B2

(12) United States Patent
Fleming

(10) Patent No.: US 10,357,749 B2
(45) Date of Patent: Jul. 23, 2019

(54) CONTAINER/LID/BLENDER INTERLOCK

(71) Applicant: VITA-MIX MANAGEMENT CORPORATION, Olmsted Township, OH (US)

(72) Inventor: Mark Frederick Fleming, Strongsville, OH (US)

(73) Assignee: VITA-MIX MANAGEMENT CORPORATION, Olmsted Township, OH (US)

( * ) Notice: Subject to any disclaimer, the term of this patent is extended or adjusted under 35 U.S.C. 154(b) by 0 days.

(21) Appl. No.: 15/991,393

(22) Filed: May 29, 2018

(65) Prior Publication Data

US 2019/0001287 A1    Jan. 3, 2019

Related U.S. Application Data

(63) Continuation of application No. 14/663,627, filed on Mar. 20, 2015, now Pat. No. 9,981,234.

(60) Provisional application No. 61/968,150, filed on Mar. 20, 2014.

(51) Int. Cl.
| *B01F 13/04* | (2006.01) |
| *B01F 15/00* | (2006.01) |
| *F16P 3/08* | (2006.01) |
| *F16P 3/10* | (2006.01) |
| *A47J 43/07* | (2006.01) |

(52) U.S. Cl.
CPC ......... *B01F 13/047* (2013.01); *A47J 43/0772* (2013.01); *B01F 15/00214* (2013.01); *B01F 15/00253* (2013.01); *F16P 3/08* (2013.01); *F16P 3/10* (2013.01)

(58) Field of Classification Search
USPC ........................................ 366/206, 445, 446
See application file for complete search history.

(56) References Cited

U.S. PATENT DOCUMENTS

| 2,372,862 | A | 4/1945 | Strauss et al. |
| D227,535 | S | 7/1973 | Grimes |
| 4,561,782 | A | 12/1985 | Jacobsen et al. |
| 4,655,373 | A | 4/1987 | Essen |
| 4,664,530 | A | 5/1987 | Kurome et al. |

(Continued)

FOREIGN PATENT DOCUMENTS

| CH | 172686 | 10/1934 |
| CN | 200943620 | 11/2007 |

(Continued)

OTHER PUBLICATIONS

European Patent Office Communication pursuant to Article 94(3) EPC for Application No. 15765838.6, dated Mar. 26, 2019; 5 pages.

*Primary Examiner* — Mark Halpern
(74) *Attorney, Agent, or Firm* — McDonald Hopkins LLC

(57) ABSTRACT

An interlocking method and blending apparatus is provided which includes a base, container, and lid. The apparatus comprises light emitters, light sensors, and light reflectors. Light is emitted by the light emitters from the base, through the container, and toward the lid. Light reflectors in the lid reflect the light back through the container and toward the base. The light sensors detect the reflected light and can be used to control operation of the blender and illumination of the container. Light may be in the visible spectrum, or sub-visible spectrum. The light emitters and light sensors may be at the base and/or the bottom of the container.

5 Claims, 4 Drawing Sheets

(56) References Cited

U.S. PATENT DOCUMENTS

| | | |
|---|---|---|
| D295,012 S | 4/1988 | Gelber |
| 4,822,175 A | 4/1989 | Barnard et al. |
| 4,891,966 A | 1/1990 | Kramer |
| D305,973 S | 2/1990 | Barnard et al. |
| D309,077 S | 7/1990 | Pomroy |
| D309,399 S | 7/1990 | Barnard et al. |
| D321,647 S | 11/1991 | Oldorf |
| D336,590 S | 6/1993 | Barnard |
| 5,275,307 A | 1/1994 | Freese |
| D345,488 S | 3/1994 | Barnard et al. |
| 5,323,973 A | 6/1994 | Ferrara, Jr. |
| D366,418 S | 1/1996 | Lown et al. |
| 5,533,797 A | 7/1996 | Gelber |
| D374,590 S | 10/1996 | Ahern, Jr. |
| 5,678,718 A | 10/1997 | Morris et al. |
| 5,696,358 A | 12/1997 | Pfordresher |
| 5,803,598 A | 9/1998 | Harry et al. |
| 5,901,906 A | 5/1999 | Bouldin |
| D412,809 S | 8/1999 | Toro et al. |
| 5,957,333 A | 9/1999 | Losenno et al. |
| 5,957,577 A | 9/1999 | Dickson et al. |
| 5,962,060 A | 10/1999 | Farrell |
| 6,059,445 A | 5/2000 | St. John et al. |
| D429,956 S | 8/2000 | Bohannon, Jr. et al. |
| 6,102,246 A | 8/2000 | Goulet et al. |
| D419,369 S | 10/2000 | Naft et al. |
| D432,864 S | 10/2000 | Kindig et al. |
| D435,192 S | 12/2000 | Bohannon, Jr. et al. |
| D437,731 S | 6/2001 | Thackray |
| D452,296 S | 12/2001 | Egnell et al. |
| 6,431,744 B1 | 8/2002 | Ash et al. |
| 6,531,967 B2 | 3/2003 | Djorup |
| D480,915 S | 10/2003 | Kolar et al. |
| D481,258 S | 10/2003 | Brady et al. |
| 6,755,305 B2 | 6/2004 | Nance |
| D495,925 S | 9/2004 | Ulanski et al. |
| 6,854,876 B2 | 2/2005 | Dickson |
| D506,393 S | 6/2005 | Nottingham et al. |
| 6,979,117 B2 | 12/2005 | Dickson, Jr. |
| D514,868 S | 2/2006 | Achenbach et al. |
| 7,018,091 B2 | 3/2006 | Arroubi et al. |
| 7,047,872 B2 | 5/2006 | Mulle |
| 7,063,456 B2 | 6/2006 | Miller et al. |
| D526,839 S | 8/2006 | Boozer et al. |
| D528,363 S | 9/2006 | Ulanski et al. |
| 7,267,478 B2 | 9/2007 | Miller et al. |
| D552,916 S | 10/2007 | Bodum |
| 7,341,209 B1 | 3/2008 | Ko |
| 7,350,963 B2 | 4/2008 | Williams et al. |
| D577,545 S | 9/2008 | Ulanski |
| D587,526 S | 3/2009 | Barnard et al. |
| D588,406 S | 3/2009 | Ulanski et al. |
| D621,656 S | 8/2010 | Ulanski et al. |
| D662,359 S | 6/2012 | Boozer et al. |
| D678,727 S | 3/2013 | Kolar et al. |
| 8,529,120 B2 | 9/2013 | Ulanski et al. |
| 8,555,922 B2 | 10/2013 | Migliore et al. |
| 8,814,011 B2 | 8/2014 | Ulanski et al. |
| 9,144,348 B2 | 9/2015 | Fevre |
| 2003/0042805 A1 | 3/2003 | Bates et al. |
| 2003/0205148 A1 | 11/2003 | Rubin et al. |
| 2005/0145717 A1 | 7/2005 | Katz et al. |
| 2005/0152215 A1 | 7/2005 | Stuart et al. |
| 2007/0210194 A1 | 9/2007 | Carnevale et al. |
| 2007/0286016 A1 | 12/2007 | Sun |
| 2009/0095322 A1 | 4/2009 | Wakao et al. |
| 2010/0212076 A1 | 8/2010 | Kihs |
| 2010/0229894 A1 | 9/2010 | Nagatani et al. |
| 2011/0210195 A1 | 9/2011 | Garcia |
| 2011/0240624 A1 | 10/2011 | Zhang et al. |
| 2011/0248108 A1 | 10/2011 | Carriere |
| 2015/0265983 A1 | 9/2015 | Fleming et al. |

FOREIGN PATENT DOCUMENTS

| | | |
|---|---|---|
| EP | 0046169 | 2/1982 |
| EP | 0963726 | 12/1999 |
| FR | 2696087 | 4/1994 |
| FR | 2791546 | 10/2000 |
| GB | 699947 | 11/1953 |
| GB | 2158911 | 11/1985 |
| JP | 2002210287 | 7/2002 |
| JP | 2005040147 | 2/2005 |
| KR | 1019950003546 | 2/1995 |
| KR | 2019990001638 | 1/1999 |
| KR | 1020010073392 | 8/2001 |
| KR | 1020130085276 | 7/2013 |
| WO | 8801199 | 2/1988 |
| WO | 2009000042 | 12/2008 |
| WO | 2011008234 | 1/2011 |

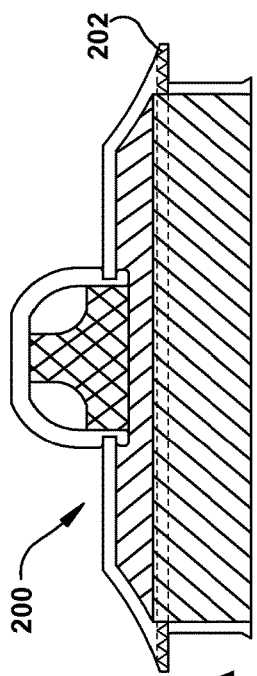
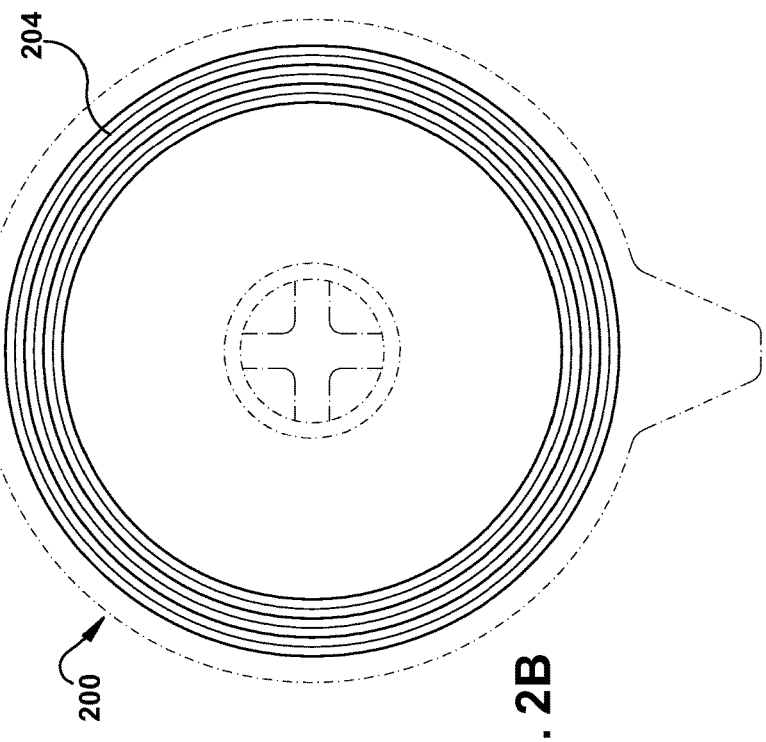
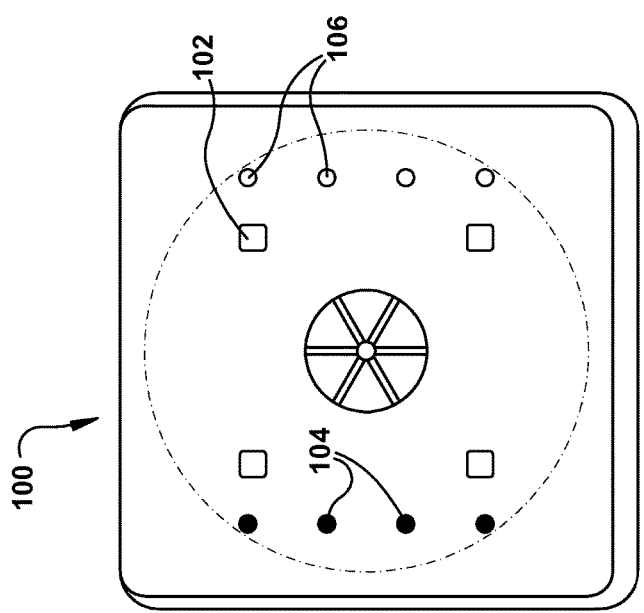

CONTAINER/LID/BLENDER INTERLOCK

CROSS-REFERENCE TO RELATED APPLICATIONS

This application is a continuation of U.S. Utility patent application Ser. No. 14/663,627, filed on Mar. 20, 2015, and entitled "Container/Lid/Blender Interlock," which claims priority to U.S. Provisional Application Ser. No. 61/968,150 filed on Mar. 20, 2014, entitled "Container/Lid/Blender Interlock," the entirety of which are incorporated herein by reference.

BACKGROUND OF THE INVENTION

The present disclosure relates to a container/lid/blender interlock apparatus and method. More specifically, the present disclosure relates to the use of light in the interlock apparatus and method for preventing blender operation when the lid is not properly on.

Current blender interlock systems are mechanical and generally only interlock a blender base with a blender container. In those systems, the interlock is activated when the container depresses a switch in the base as the container is set on the base. One variation to this system uses a rod that parallels the container and activates the interlock when the container lid is secured. Other variations use a magnetic switch in the base and metal activators in the container.

BRIEF SUMMARY OF THE INVENTION

According to one example described herein, a method for interlocking a blender base, container, and lid, the method comprises the steps of: emitting light from at least one of the base and container toward the lid; reflecting the emitted light from the lid toward the base; and sensing the reflected light at at least one of the base and container.

In various embodiments of the above example, the method further comprises the step of controlling operation of the blender based at least in part on the step of sensing the reflected light at the base; the method further comprises the step of propagating the light around the rim of the lid; the emitted light is in the visible spectrum; and/or the emitted light is emitted through the container, the reflected light is reflected through the container, and the emitted light and reflected light illuminate a medium in the container.

According to another example described herein, a blending apparatus comprises: a base; a container; a lid; at least one light emitter; and at least one light sensor configured to sense light emitted by the at least one light emitter, wherein the lid comprises at least one light reflector.

In various embodiments of the above example, light is emitted from the at least one light emitter toward the lid, the emitted light is reflected by the at least one light reflector in the lid toward the base, and the reflected light is detected by the at least one light sensor in the base; the light is emitted from the at least one light emitter toward the lid, the emitted light is reflected by the at least one light reflector in the lid toward the base, and the reflected light is detected by the at least one light sensor in the base when the container is seated on the base and the lid is positioned on the container in order to ready the apparatus for a blending operation; the emitted light is reflected by the at least one light reflector in the lid toward the base, and the reflected light is detected by the at least one light sensor in the base when the container is positioned on the base and the lid is positioned on the container in a manner which directs the emitted light to the at least one light reflector for detection by the at least one light sensor; the emitted light is emitted through the container, the reflected light is reflected through the container, and the emitted light and reflected light illuminate a medium in the container; the at least one light emitter and the at least one light sensor are located on different sides of the base; the at least one light emitter and the at least one light sensor are located on the same side of the base; the at least one light emitter and the at least one light sensor are located at a bottom of the container; the at least one light reflector of the lid comprises at least one prism shaped light ring in the lid; the light ring is located in a rim of the lid; a shape of the light ring substantially corresponds to a shape of the container lid, and the light ring is located interior to an outer edge of the container lid; the at least one light emitter is configured to emit light in the visible spectrum; and/or a signal from the at least one light sensor in part controls operation of the blender.

According to still another example described herein, a blending apparatus comprises: a base having a motor; at least one light emitter; at least one light sensor; a container that is selectively positionable on the base; and a lid having at least one light reflector and being selectively positionable on the container, wherein operation of the motor requires light emitted from the at least one light emitter to be sensed by the at least one light sensor.

BRIEF DESCRIPTION OF THE DRAWINGS

FIG. 1 is an illustration of a top view of a blender base according to one example;

FIG. 2A is an illustration of a cross-section of a blender lid according to one example;

FIG. 2B is an illustration of light rings in a blender lid according to one example;

DETAILED DESCRIPTION OF THE INVENTION

Figure 3:
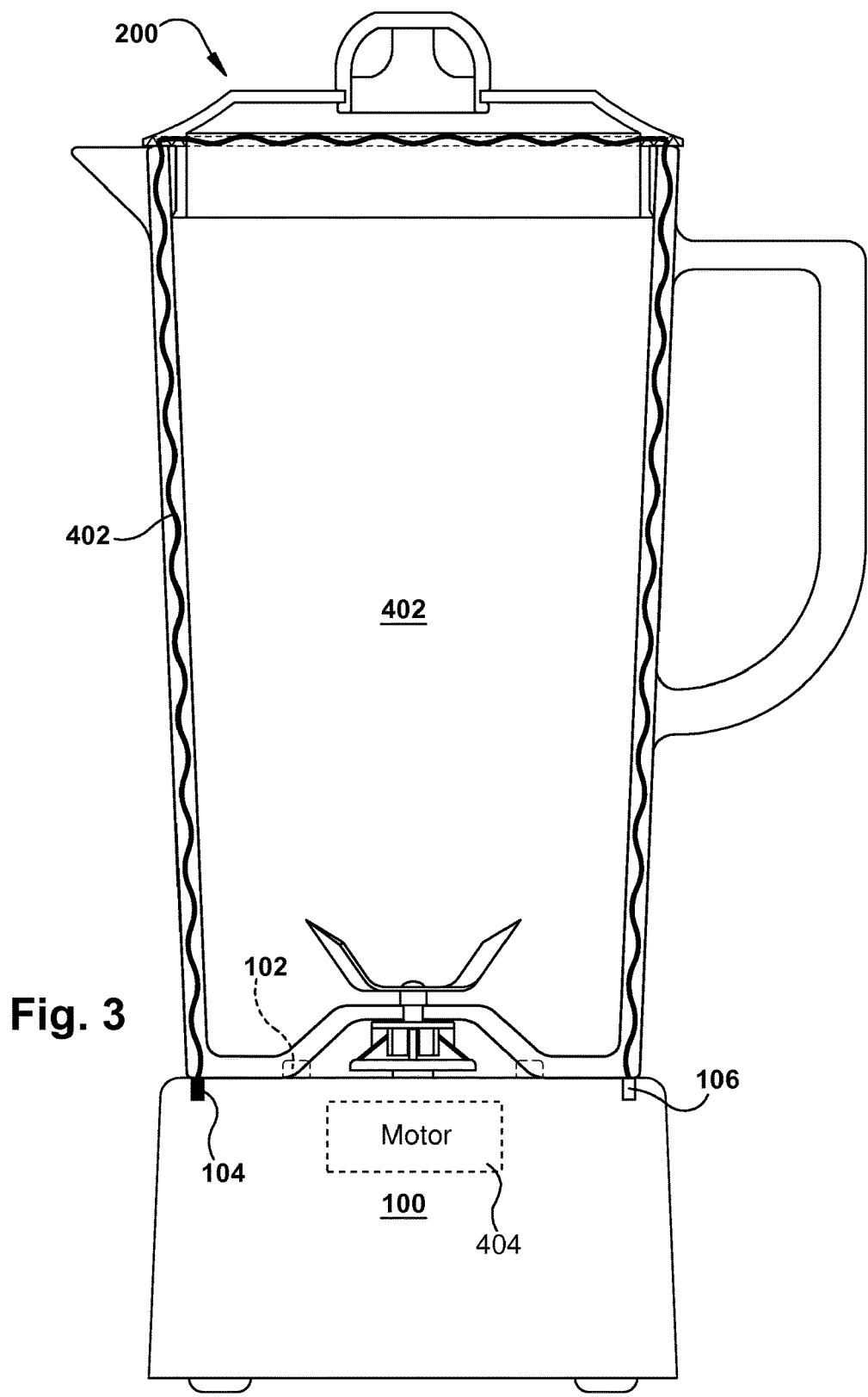
FIG. 3 is an illustration of a blender with a lid and base showing a light wave movement according to one example.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

The present disclosure is directed to a container/lid/blender interlock apparatus and method. That is, the operation of a blender requires an interlocking of a blender base, container, and lid to ensure the safety of the user and maintain operational efficiency of the blender. More specifically, the present disclosure is directed to the use of light, and the propagation thereof, between the blender base and lid.

Generally, according to the present disclosure, light waves are emitted from the blender base, through the container, and reflected back by the blender lid. The reflected light is then detected at the blender base. In this way, if the lid is not properly situated on the container, or the container not properly situated on the base, the emitted light will not propagate and reflect such that it can be detected at the base. The detection of the reflected light can be used to control operation of the blender.

It should be noted that the presently disclosed interlocking apparatus and method do not interfere or alter the blending function(s) as understood by those skilled in the art. That is, the apparatus and method described herein could be applied to any blender comprising a base, container, and lid, regardless of other functionalities of the blender.

Figure 4:
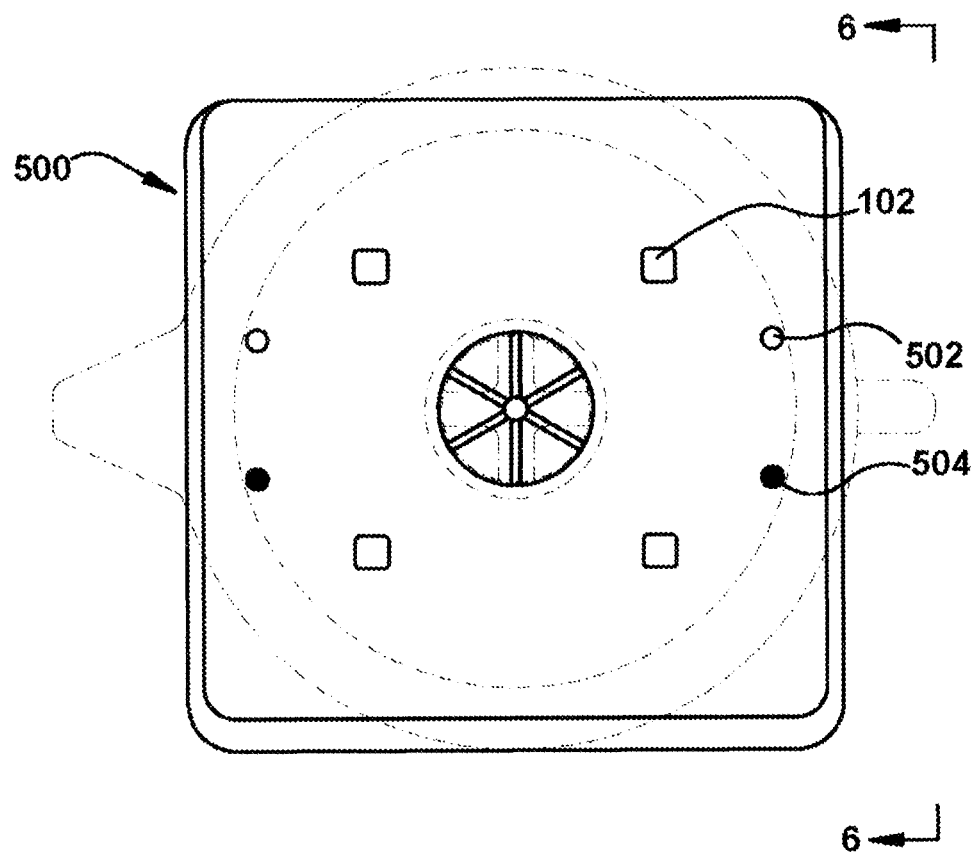
FIG. 4 is an illustration of a top view of a blender base according to one example.

Turning now to the figures, one aspect of the present disclosure relates to a blender base for emitting and detecting reflected light. FIGS. 1 and 4 illustrate two examples of a blender base 100, 500 as shown from a top view. In both figures, the blender bases 100, 500 comprise support posts 102 that may be inserted into the base of a container to operatively position the container to the blender base 100, 500. Although four support posts 102 are shown, it should be noted that a greater or fewer number, and posts of a different shape, may be used depending on the particular embodiment.

In the example of FIG. 1, light emitters 104 are shown along one side of the base 100. The light emitters 104 may emit wavelengths of light from the visible portion of the electromagnetic spectrum, or the light may be from a sub-visible portion of the electromagnetic spectrum. For example, sub-visible light may include infrared (IR) light or ultraviolet (UV) light. However, it should be noted that any wave frequency in the electromagnetic spectrum capable of being emitted and reflected is envisioned to be within the scope of the present disclosure. The examples of visible, IR, and UV light are not intended to be limiting examples.

In various embodiments, the light emitters 104 may also be able to emit a combination of wavelengths of light. That is, a single light emitter 104 may be able to emit multiple wavelengths of light and/or different light emitters 104 may be able to emit different wavelengths of light spanning visible and sub-visible spectrums.

Additionally, light sensors 106 are shown on an opposite side of the base 100. The light sensors are capable of detecting any emitted light that has been reflected by a lid (as discussed in more detail below). In some embodiments, the light sensors 106 may also be able to detect and distinguish wavelengths of light not emitted by the light emitters 104. Although four light emitters 104 and light sensors 106 are shown, it should be noted that a different number of light emitters 104 and light sensors 106 may be used in various embodiments.

The location and relative orientation of the light emitters 104 and light sensors 106 may also be varied depending on the embodiment. For example, similar to FIG. 1, the base 500 shown in FIG. 4 also contains light emitters 502 and light sensors 504. However, in FIG. 4, a combination of light emitters 502 and light sensors 504 are shown on the same side of the base 500. This is in contrast to the example of FIG. 1 where the light emitters 104 and light sensors 106 are located on opposite sides of the base 100. It is also noted that the number of light emitters 104, 502 and light sensors 106, 504 illustrated is not to be limiting. That is, any number of light emitters 104, 502 and light sensors 106, 504 may be used within the scope of the present disclosure. Accordingly, various combinations and arrangements of light emitters and light sensors could be used within the scope of the present disclosure. In still other embodiments, light emitters and light sensors may be located on the bottom of a container, rather than on the base.

Figure 5:
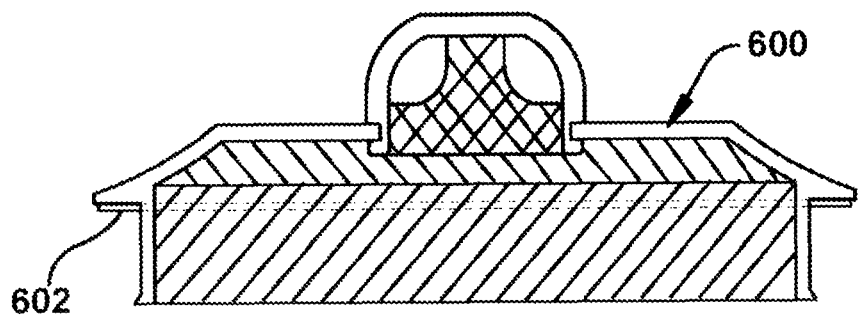
FIG. 5 is an illustration of a cross-section of a blender lid according to one example.

Another aspect of the present disclosure relates to a blender lid for reflecting the emitted light from the blender base back to the base. One example is shown in FIGS. 2A and 2B. As shown in a cross section in FIG. 2A, the blender lid 200 comprises a plurality of prisms 202 that form light rings 204 around the blender lid 200 for directing emitted light into the light ring 204 and reflecting light back to the base. The light ring 204, as shown in FIG. 2B, can be inserted in the lid, around the rim, so as to direct light around the entirety of the blender container. According to the example shown in FIG. 5, the blender lid 600 comprises a lip rim 602 embedded with a reflective metal. In this example, the light is reflected downward, rather than additionally being circulated around the lid as in FIGS. 2A and 2B.

FIG. 3 illustrates a fully assembled blender base 100, container, and lid according to one example. As can be seen in FIG. 3, in addition to support posts 102 extending from the base 100 toward the container, light sensors 106 are located on one side of the assembled blender while light emitters 104 are located on the opposite side. Additionally, a light wave 400 is emitted from the light emitters through the container medium 402. In some embodiments, when the emitted light is in the visible spectrum, the light wave 400 may be used to color the medium in the container 402. When the light wave 400 reaches the lid 200, the light rings 204 propagate the light around the edge of the top of the container/lid junction. The prisms 202 located in the lid reflect the light wave back down the container medium to the light sensors 106.

Figure 6:
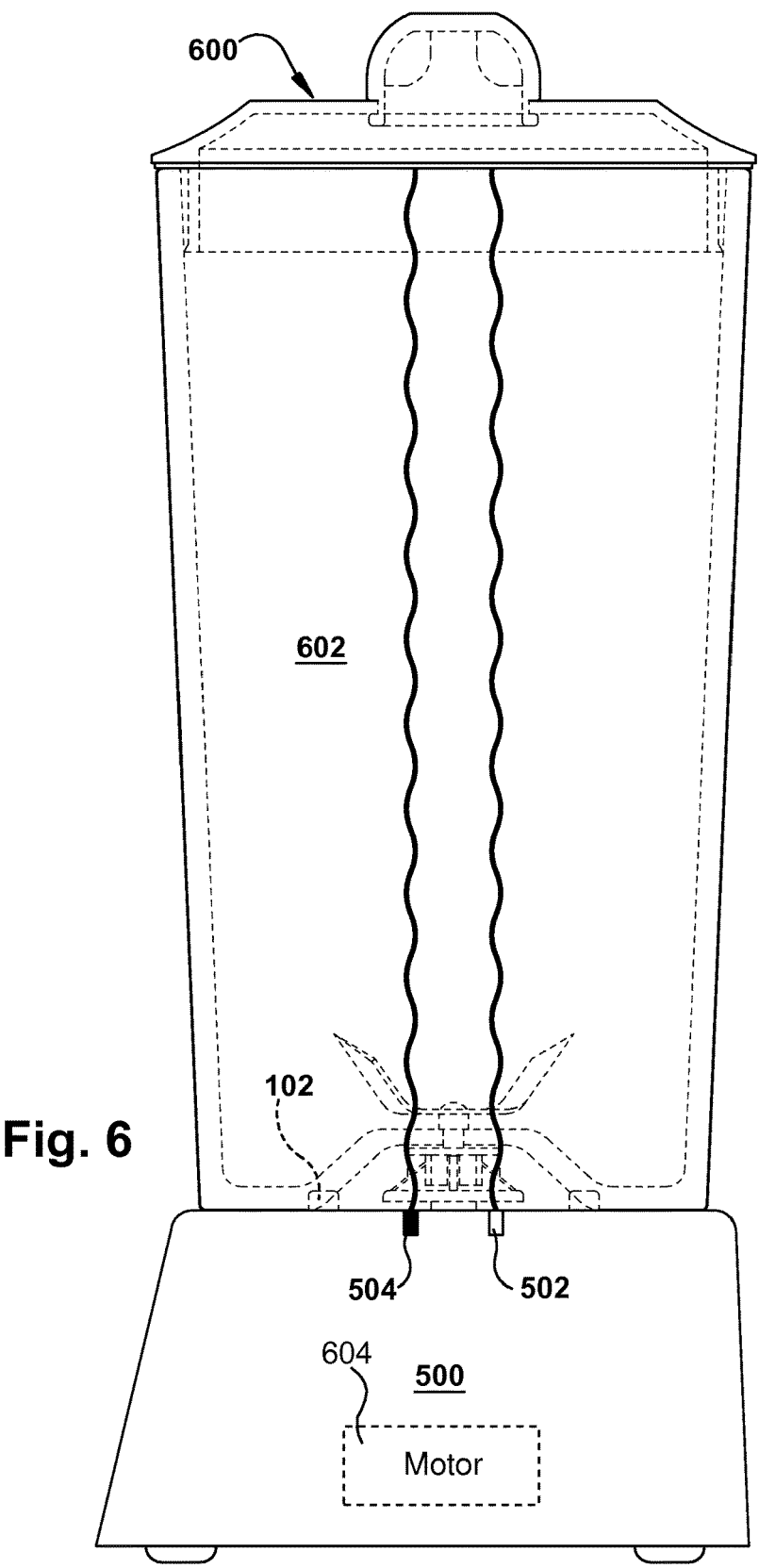
FIG. 6 is an illustration of a blender with a lid and base showing a light wave movement according to one example.

A similar example is illustrated in FIG. 6, however, both the light emitters 502 and light sensors 504 are located on the same side of the base, as illustrated in FIG. 4. Accordingly, as shown in FIG. 6, when a light wave 800 is emitted through a medium in the blender container 604, rather than being propagated around the rim, the reflective metal in the lip rim 602 of the lid 600 reflects the light wave 800 downward along the same side of the blender as it was emitted. When the light wave 800 reaches the base 500, it is detected by the light sensors 504.

In still other embodiments, a blender lid may include both the prisms 202 and light rings 204 as shown in FIGS. 2A and 2B for blender lid 200, and the lip rim 602 embedded with a reflective metal as shown in FIG. 6, blender lid 600. Light reflected by both the prisms/light rings 202, 204 and reflective metal in the lip rim 602 can then be used as a check to ensure no false positives are recorded.

In various embodiments, the blender can "lock" unless the light sensors 106, 504 have detected the reflected light. In other words, the detection of reflected light may act as a power switch such that no power can go to the blending aperture unless light is detected. In other embodiments, the physical controls may be mechanically or electrically locked so that a user may not turn on the blender unless the light sensors detect the reflected light. In still other embodiments, various features may be turned on or off, or warning lights or sounds may be emitted if a user tries to use the blender and the light sensors do not detect the reflected light. In this way, the blender base, container, and lid can be interlocked to control operation of the blender.

The above-described functions of light emitters 104, 502 and light sensors 106, 504, as well as the functions of the blender, may be controlled by a controller (not shown). The controller may be formed as one or more integrated circuits or other electronic circuitry including resistors, capacitors, inductors, transistors, and the like. For example, a motor 404, 604 in the base 100, 500 may be activated by the controller only when the light sensors 106, 504 sense light emitted by the light emitters 104, 502 and reflected by light reflectors in the lid 202/204, 602.

It is also noted that the container may be powered, for example, as described in U.S. patent application Ser. No. 14/213,557, the entirety of which is herein incorporated by reference.

It should be evident that this disclosure is by way of example and that various changes may be made by adding, modifying or eliminating details without departing from the fair scope of the teaching contained in this disclosure. The invention is therefore not limited to particular details of this disclosure except to the extent that the following claims are necessarily so limited.

What is claimed is:

1. A method for interlocking a blender base, container, and lid, the method comprising the steps of:
    emitting light from at least one of the base and container toward the lid;
    reflecting the emitted light from the lid toward the base; and
    sensing the reflected light at at least one of the base and container.

2. The method of claim 1, further comprising the step of controlling operation of the blender based at least in part on the step of sensing the reflected light at the base.

3. The method of claim 1, further comprising the step of propagating the light around the rim of the lid.

4. The method of claim 1, wherein the emitted light is in the visible spectrum.

5. The method of claim 4, wherein the emitted light is emitted through the container, the reflected light is reflected through the container, and the emitted light and reflected light illuminate a medium in the container.

* * * * *